United States Patent
Liao (10) Patent No.: US 11,554,547 B2
(45) Date of Patent: Jan. 17, 2023

(54) QUICK RELEASE HOTEND

(71) Applicant: INFINITY 3D PRINTER CO., LTD., Kaohsiung (TW)

(72) Inventor: Chung-Yi Liao, Kaohsiung (TW)

(73) Assignee: INFINITY 3D PRINTER CO., LTD., Kaohsiung (TW)

( * ) Notice: Subject to any disclaimer, the term of this patent is extended or adjusted under 35 U.S.C. 154(b) by 106 days.

(21) Appl. No.: 17/224,606

(22) Filed: Apr. 7, 2021

(65) Prior Publication Data

US 2021/0316505 A1 Oct. 14, 2021

(30) Foreign Application Priority Data

Apr. 14, 2020 (TW) .................................. 109112500

(51) Int. Cl.
| | | |
|---|---|---|
| *B29C 64/209* | (2017.01) | |
| *B29C 64/118* | (2017.01) | |
| *B33Y 30/00* | (2015.01) | |

(52) U.S. Cl.
CPC .......... *B29C 64/209* (2017.08); *B29C 64/118* (2017.08); *B33Y 30/00* (2014.12)

(58) Field of Classification Search
CPC ...... B29C 64/209; B29C 64/118; B33Y 30/00
See application file for complete search history.

(56) References Cited

U.S. PATENT DOCUMENTS

| | | |
|---|---|---|
| 6,244,527 B1 | 6/2001 | Ferrazza et al. |
| 2010/0100224 A1* | 4/2010 | Comb ................... B29C 64/106 700/118 |

FOREIGN PATENT DOCUMENTS

| | | |
|---|---|---|
| CN | 1319455 A | 10/2001 |
| CN | 106335182 A | 1/2017 |
| CN | 206983282 U | 2/2018 |
| CN | 207594335 U | 7/2018 |
| CN | 207657396 U | 7/2018 |
| TW | M574553 U | 2/2019 |
| TW | M598236 U | 7/2020 |

\* cited by examiner

*Primary Examiner* — Joseph S Del Sole
*Assistant Examiner* — John Robitaille
(74) *Attorney, Agent, or Firm* — Alan D. Kamrath; Karin L. Williams; Mayer & Williams PC (57) ABSTRACT

A quick release hotend is disclosed. The hotend includes a base having an input portion and an engaging recess, an engaging member having a first engaging portion and a second engaging portion, and a body having a protruding ring and a feeding inlet. The base has a through-hole penetrating the input portion and communicating with the engaging recess, and the base has a chamber in which an elastic element is disposed. The first engaging portion is separably coupled to the base and abut against the elastic element. The protruding ring is engaged with the engaging recess to communicate the feeding inlet with the through-hole. The body has a concave portion to which the second engaging portion is separably coupled. The body has a nozzle to which the raw material imported from the feeding inlet is guided.

18 Claims, 5 Drawing Sheets

QUICK RELEASE HOTEND

CROSS REFERENCE TO RELATED APPLICATION

The application claims the benefit of Taiwan application serial No. 109112500, filed on Apr. 14, 2020, and the entire contents of which are incorporated herein by reference.

BACKGROUND OF THE INVENTION

1. Field of the Invention

The present invention generally relates to a quick release hotend of a 3D printer and, more particularly, to a quick release hotend which can be stably fixed in position.

2. Description of the Related Art

Figure 1:
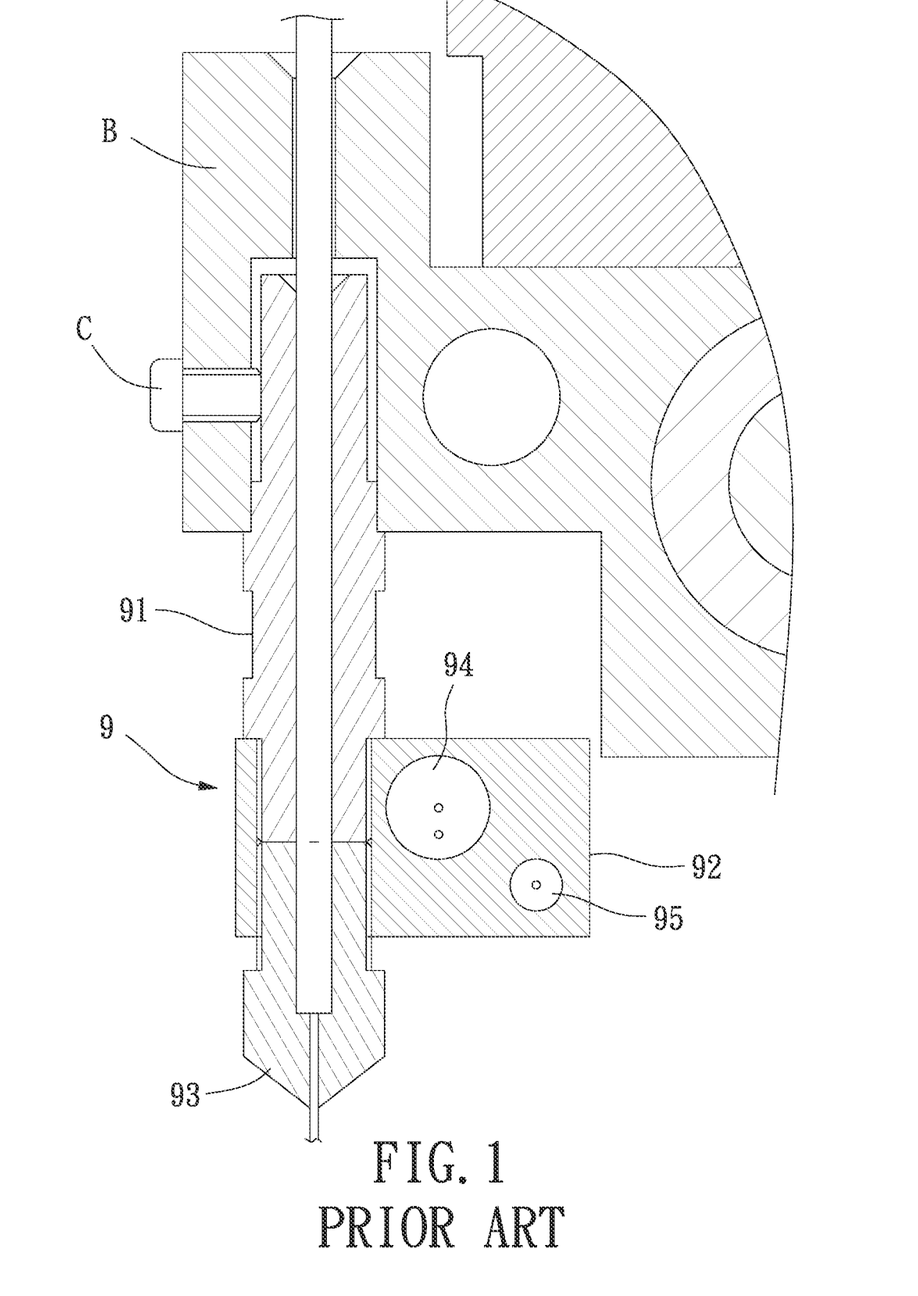
FIG. 1 shows a cross-sectional view of a hotend of a conventional 3D printer.

Please refer to FIG. 1, which shows a hotend 9 of a conventional 3D printer. The conventional hotend 9 has a nozzle throat 91, a heating seat 92 and a nozzle 93. The nozzle throat 91 and the nozzle 93 are coupled to the heating seat 92, respectively. The nozzle throat 91 is communicated with the interior of the nozzle 93. A heater 94 and a temperature sensor 95 are fixed on the heating seat 92, respectively. An upper end of the nozzle throat 91 can extend into a hotend holder B and be secured by a bolt C to fix the hotend 9 at a predetermined position of the hotend holder B. In this way, the 3D printer filament can pass through the nozzle throat 91 from above, be heated and softened by the heater 94 to flow into the nozzle 93, and then be exported from the nozzle 93 for printing. Moreover, the temperature sensor 95 is provided for the user to monitor the temperature of the heating seat 92, so as to avoid the damage of adjacent components caused by excessively high temperature of the heating seat 92. An embodiment similar to the conventional hotend 9 has been disclosed in Taiwan Patent No. M574553.

In the above-mentioned conventional hotend 9, the nozzle throat 91 is fixed to the hotend holder B by the bolt C. Nevertheless, during the 3D printing process, the hotend 9 is subject to continuous high-frequency vibration, and is sometimes pulled by a force when the hotend 9 meets obstacles. These will cause the bolt C to loosen easily, making it difficult for the hotend 9 to be positioned at the predetermined position, causing the nozzle 93 hard to print products accurately. However, if the bolt C is overly secured for improved stability of the hotend 9, the nozzle throat 91 will be easily damaged, making the secureness of the bolt C hard to control. In addition, the height of the hotend 9 has to be recalibrated every time when a new hotend 9 is installed. Furthermore, there is no structure permitting quick alignment between the hotend 9 and the hotend holder B, which makes the calibration process time-consuming and labor-intensive, and the positioning accuracy of the securing mechanism provided by the bolt C is also easily affected by repeated disassembly.

In light of this, it is necessary to improve the conventional 3D printing hotend to solve the problems mentioned above.

SUMMARY OF THE INVENTION

In order to solve the above problems, it is an objective of the present invention to provide a quick release hotend which can be stably fixed at a predetermined position to improve the preciseness and quality of the printed product.

It is another objective of the present invention to provide a quick release hotend which can be replaced quickly and accurately to improve the operation efficiency.

It is yet another objective of the present invention to provide a quick release hotend which can be maintained at an appropriate working temperature, so that the service life of the quick release hotend can be prolonged.

As used herein, the term "a", "an", or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select according to desired demands in the material or assembly of the members to be connected.

The quick release hotend of the present invention includes a base having an input portion and an engaging recess, an engaging member having a first engaging portion and a second engaging portion provided at both ends of a rod, respectively, and a body having a protruding ring and a feeding inlet. The base has a through-hole penetrating the input portion and communicating with the engaging recess, and the base has a chamber in which an elastic element is disposed. The first engaging portion is separably coupled to the base and abut against the elastic element. The protruding ring is engaged with the engaging recess to communicate the feeding inlet with the through-hole. A width of a top surface of the protruding ring is greater than a width of a bottom of the engaging recess, and a gap is formed between the top surface of the protruding ring and the bottom of the engaging recess after coupling. The body has a concave portion, the second engaging portion has a protruding portion protruding from a surface of the second engaging portion toward the first engaging portion, and the protruding portion is tapered to have a width gradually decreasing from the surface of the second engaging portion to a top. A surface of the protruding portion facing a surface of the rod forms a first inclined face, and the protruding portion can be separably fastened to the concave portion. The body has a nozzle to which the raw material imported from the feeding inlet is guided.

Accordingly, the body of the quick release hotend of the present invention can be quickly coupled to or removed from the base by the positioning structures, such as the protruding ring clamping the body to the base and the engaging member elastically abutting the bottom of the body, which can be pressed and reset. During assembling, no additional alignment or calibration is required to ensure that the body can be aligned with and coupled to the predetermined position of the base, and the coupling is very stable and firm and is not prone to relative displacement. Even when the quick release hotend is subject to continuous high-frequency vibration or pulling force in the subsequent printing process, the body can be stably coupled to the base, and the coupling becomes even more stable after vibration. The problems of loosening or falling off of the body are solved, thereby achieving the effects of improved preciseness and quality of printed products. In addition, the operating temperature of the quick release hotend of the present invention can be quickly and effectively reduced through the heat dissipating portion of the body during the printing process, so that the quick release hotend can be more endurable to achieve a prolonged service life. Furthermore, the quick release hotend of the present invention will not cause the top surface of the protruding ring to abut the bottom of the engaging recess even when considering manufacturing tolerance, which may cause the conical surfaces of the protruding ring and the engaging recess unable to fully abut against each other. Therefore, the gap can ensure that the conical surfaces of the protruding ring and the engaging recess abut against each other, so that the protruding ring can be accurately and stably coupled to the engaging recess, while the preciseness of manufacturing of the base and the body can be improved.

In an example, the input portion is located on an upper surface of the base, and the base is extended to form a base wall defining an open space between the base and the base wall. The body has a seat, the protruding ring and the feeding inlet are located at a top of the seat, and the seat is disposed in the open space. Thus, the convenience of installation can be improved.

In an example, a lower surface of the base is concaved to form the engaging recess, and the engaging recess has a diameter which gradually increases from the bottom of the engaging recess toward the open space, providing the engaging recess with a substantially conical space. The protruding ring is matched with a shape of the engaging recess to closely fit with the engaging recess. Thus, the protruding ring and the engaging recess can be kept in close fit, achieving the effect of improving assembly efficiency and convenience.

In an example, a bottom of the base wall is provided with a notch, and the second engaging portion is extended into the notch. Thus, the second engaging portion can be stably coupled to the body, achieving the effect of firmly fixing the body.

In an example, the base wall is provided with a groove which is communicated with the open space, the body has a bump which is located on one side of the seat, and the bump is fitted in the groove. Thus, the bonding strength between the body and the base can be improved.

In an example, an engaging surface that the bump and the groove engage with each other is in a form of an inclined face. Thus, the body and the base can be firmly coupled.

In an example, an included angle between the first inclined face and the surface of the second engaging portion is 95 to 135 degrees. Thus, the engaging member and the body can have a resistance to a horizontal separating force, having the engaging member stably coupled to the body and preventing the body from falling off.

In an example, the concave portion is in a conical shape and has a second inclined face, a slope of the second inclined face matches with a slope of the first inclined face, and the first inclined face abuts against and hooks with the second inclined face. Thus, a firmer coupling can be achieved, providing a better resistance to a horizontal separating force, thereby achieving the effect of improving the coupling stability.

In an example, a gap is formed between a free end face of the protruding portion and a bottom of the concave portion. Thus, it can be ensured that the first inclined face abuts against the second inclined face, so that the protruding portion can be accurately and stably coupled to the concave portion, and a bottom of the engaging member can hook the body, thereby achieving the effect of improving the coupling stability.

In an example, the quick release hotend further includes a displacement system, provided with a fixing portion and a slide rail, with the fixing portion slidably disposed on the slide rail. The fixing portion has at least one second coupling portion, the base has at least one first coupling portion, and the at least one first coupling portion is coupled to the at least one second coupling portion. Thus, the quick release hotend can achieve the effect of being coupled to the displacement system conveniently and quickly.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "left", "right", "up (top)", "low (bottom)", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

Figure 2:
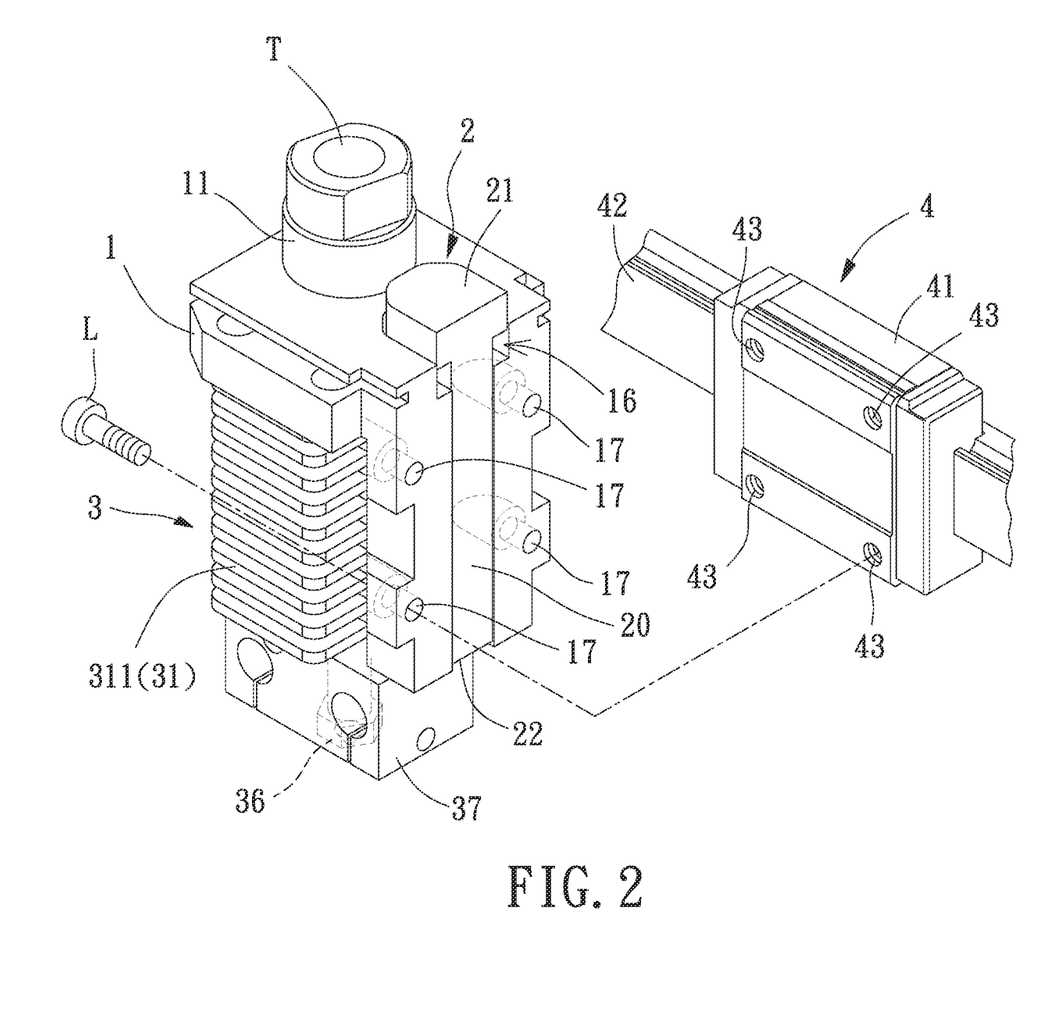
FIG. 2 shows an exploded perspective view of a hotend and a displacement system according to a preferred embodiment of the present invention.
Figure 3:
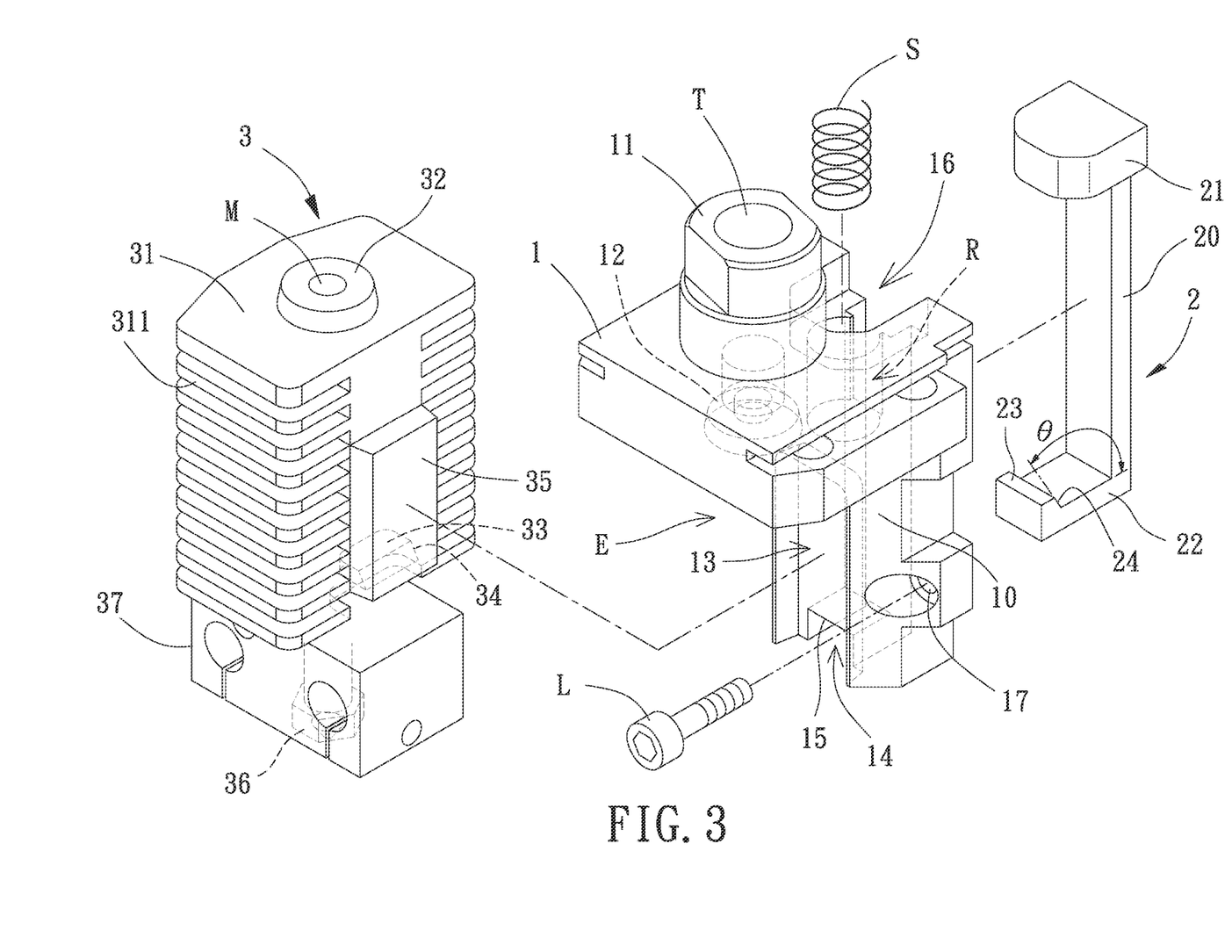
FIG. 3 shows an exploded perspective view of a hotend according to a preferred embodiment of the present invention.

Please refer to FIGS. 2 and 3, which show a preferred embodiment of the quick release hotend of the present invention. The hotend includes a base 1, an engaging member 2 and a body 3. The engaging member 2 and the body 3 are detachably coupled to the base 1, respectively.

Figure 4:
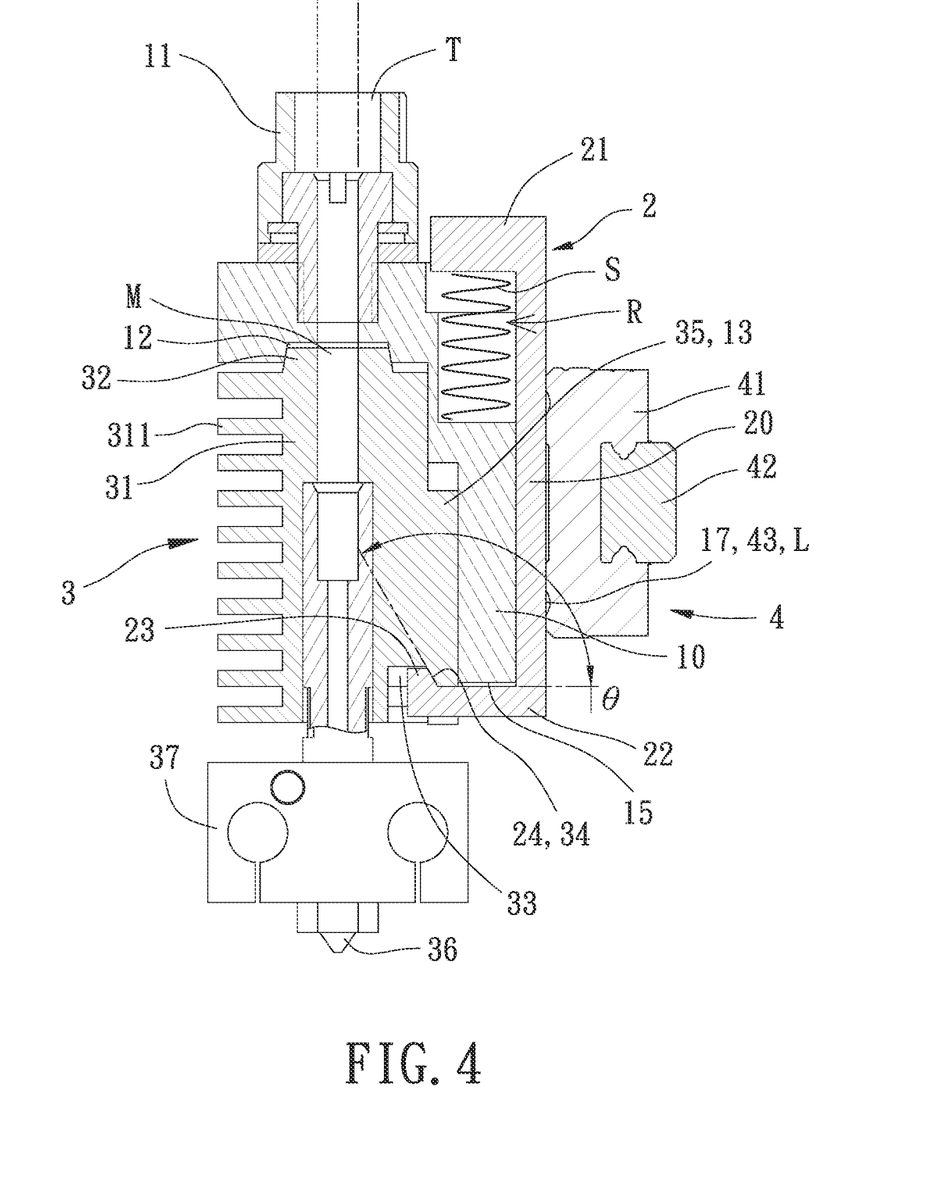
FIG. 4 shows a cross-sectional view of an assembled hotend according to a preferred embodiment of the present invention.

Please refer to FIGS. 3 and 4, the base 1 has an input portion 11 which can be located on an upper surface of the base 1. The base 1 can be extended to form a base wall 10, so that an open space E can be defined between the base 1 and the base wall 10. The base 1 can also have an engaging recess 12 which is communicated with the open space E. A through-hole T penetrates the input portion 11 and communicates with the engaging recess 12 to allow the printing material to be guided to the open space E from the input portion 11. In this embodiment, a lower surface of the base 1 is concaved to form the engaging recess 12, and the engaging recess 12 can have a diameter which gradually increases from a bottom of the engaging recess 12 toward the open space E, providing the engaging recess 12 with a substantially conical space. The base wall 10 can be provided with a groove 13 which can be communicated with the open space E. A bottom of the base wall 10 has a notch 14, so that a bottom surface of the base wall 10 forming the notch 14 can form a butting face 15. The upper surface of the base 1 can also be concaved to form a receiving portion 16, and the base wall 10 can also have a chamber R. The receiving portion 16 can be a concaved space and communicate with the chamber R, so that an elastic element S can be placed in the chamber R, while the elastic element S can be a spring. The base wall 10 can also have at least one first coupling portion 17.

The engaging member 2 can be separably coupled to the base 1 and the elastic element S is clamped between the base 1 and the engaging member 2. By means of the elastic element S, the engaging member 2 can be coupled to the base 1 and can be pressed. The engaging member 2 has a first engaging portion 21 and a second engaging portion 22, with the first engaging portion 21 separably coupled to the receiving portion 16, so that one end of the elastic element S can abut against the first engaging portion 21, and the second engaging portion 22 can be adapted to couple with the body 3. In this embodiment, the engaging member 2 is formed by a first engaging portion 21 and a second engaging portion 22 provided at both ends of a rod 20, respectively, and the second engaging portion 22 can extend into the notch 14 and abut against the butting face 15 of the notch 14. Thus, the engaging member 2 can be stably coupled to the base 1. Preferably, the second engaging portion 22 may further have a protruding portion 23 which can protrude from a surface of the second engaging portion 22 toward the first engaging portion 21. The protruding portion 23 can be tapered to have a width gradually decreasing from the surface of the second engaging portion 22 toward a top, so that a first inclined face 24 can be formed on the protruding portion 23 facing the rod 20. An included angle θ between the first inclined face 24 and the surface of the second engaging portion 22 can be 95 to 135 degrees. Preferably, the included angle θ is about 120 degrees.

The body 3 can be provided with a seat 31, and the seat 31 can be provided with a heat dissipating portion 311, so that the body 3 has a better heat dissipation. The heat dissipating portion 311 can be a plurality of fins. The top of the seat 31 can be provided with a protruding ring 32 and a feeding inlet M. The protruding ring 32 can be matched with a shape of the engaging recess 12 of the base 1, so that the body 3 can be coupled to the engaging recess 12 by the protruding ring 32, and the feeding inlet M can be aligned with the input portion 11. Preferably, the protruding ring 32 has a conical shape to fit the conical space of the engaging recess 12, so that the protruding ring 32 can enter and exit the engaging recess 12 smoothly, and the protruding ring 32 can fit with the engaging recess 12 closely. A slope of the protruding ring 32 can match with a slope of the engaging recess 12, and a width of a top surface of the protruding ring 32 can be greater than a width of the bottom of the engaging recess 12, so that the protruding ring 32 can be automatically guided by the matched cone shape when inserting into the engaging recess 12. Thus, the feed inlet M can be accurately aligned with the input portion 11 without adjustment. After coupling, a gap can still exist between the top surface of the protruding ring 32 and the bottom of the engaging recess 12, and the top surface of the protruding ring 32 will not abut against the bottom of the engaging recess 12 even when considering manufacturing tolerance, which may cause the conical surfaces of the protruding ring 32 and the engaging recess 12 unable to fully abut against each other. Therefore, the gap can ensure that the conical surfaces of the protruding ring 32 and the engaging recess 12 abut against each other, so that the protruding ring 32 can be accurately and stably coupled to the engaging recess 12, while a wider range of manufacturing tolerance of the base 1 and the body 3 can be permissible.

A bottom of the seat 31 may be provided with a concave portion 33 adapted for coupling with the second engaging portion 22 of the engaging member 2. The concave portion 33 can be concaved inward from the bottom of the seat 31, and the concave portion 33 can also be in a conical shape and have a second inclined face 34. A slope of the second inclined face 34 can match with a slope of the first inclined face 24, so that when the protruding portion 23 of the engaging member 2 is fitted into the concave portion 33 of the body 3, the protruding portion 23 and the concave portion 33 can abut against each other be hooked by the first inclined face 24 and the second inclined face 34. Thus, a firmer coupling can be achieved, providing a better resistance to a horizontal separating force. The surface of the second engaging portion 22 abuts against the butting face 15 of the notch 14, and after the protruding portion 23 is coupled to the concave portion 33, a gap can be formed between a free end face of the protruding portion 23 and a bottom of the concave portion 33, so as to ensure that the protruding portion 23 and the concave portion 33 abut against each other by the first inclined face 24 and the second inclined face 34. Thus, the protruding portion 23 can accurately and stably couple to the concave portion 33, and a bottom of the engaging member 2 can automatically hook the body 3. As a result, the requirement for the elastic reset capability of the elastic element S can be reduced, and the elastic element S with a lower cost can be used.

The body 3 of this embodiment may also have a bump 35 which can be located on one side of the seat 31, so that the bump 35 can be quickly and firmly fitted in the groove 13 of the base wall 10. Preferably, an engaging surface that the bump 35 and the groove 13 engage with each other is also in a form of an inclined face, so that the body 3 and the base 1 can be firmly coupled. Accordingly, the body 3 is prevented from moving up and down or left and right with respect to the base 1 by stably coupling the protruding ring 32 to the engaging recess 12. Thus, the body 3 can maintain a stable coupling to the base 1 in any direction, and be prevented from loosening due to vibration during printing or being pulled by external forces.

The body 3 is further provided with a nozzle 36, so that the raw material imported from the feeding inlet M can be guided to the nozzle 36, and the nozzle 36 is preferably located below the seat 31. The body 3 can also be provided with a heating device 37 which can heat up the nozzle 36 to soften the raw material imported from the feeding inlet M for spraying into a printing space by the nozzle 36 to complete printing.

Please refer to FIG. 2, when using the quick release hotend of the present invention, the quick release hotend can be coupled to a displacement system 4 for movement control. The quick release hotend can be coupled to the displacement system 4 by means of locking, adhering, welding, clamping or magnetic attraction, etc., as long as a stable coupling can be achieved, and the present invention is not limited in this regard. In this embodiment, the displacement system 4 is provided with a fixing portion 41 and a slide rail 42, with the fixing portion 41 slidably disposed on the slide rail 42. The fixing portion 41 has at least one second coupling portion 43, the base 1 has at least one first coupling portion 17, and the at least one first coupling portion 17 can be coupled to the at least one second coupling portion 43. The coupling of the at least one first coupling portion 17 and the at least one second coupling portion 43 can be, for example, a positioning hole inserted by a positioning element L such as a bolt, a nut, etc., so that the base 1 is coupled to the displacement system 4. In this way, only the base 1 is coupled to the displacement system 4, and the engaging member 2 can still move relative to the base 1 and the displacement system 4. Preferably, the number of each of the at least one first coupling portion 17 and the at least one second coupling portion 43 can be four, so as to increase the stability of the coupling and prevent the quick release hotend from falling or loosening during movement.

Figure 5:
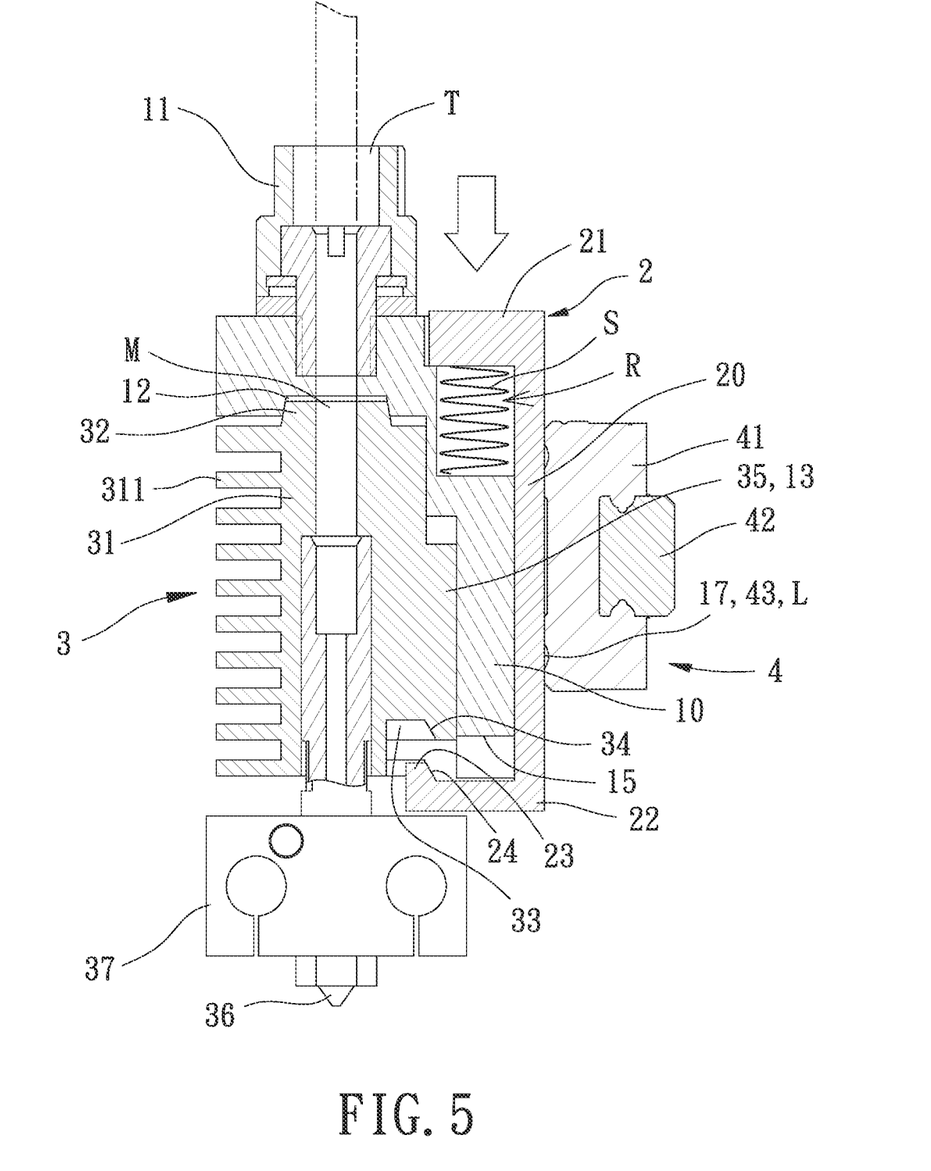
FIG. 5 shows a disassembling diagram of the hotend as shown in FIG. 4.

Please refer to FIGS. 4 and 5, when the quick release hotend of the present invention is being assembled, disassembled or replaced, a user can quickly take out the body 3 by pressing the first engaging portion 21 of the engaging member 2. More specifically, when the user needs to replace the body 3, the first engaging portion 21 of the engaging member 2 is pressed to compress the elastic element S, so that the second engaging portion 22 is moved downward. The concave portion 33 of the body 3 is no longer engaged by the protruding portion 23 of the engaging member 2, so that the used body 3 can be separated from the engaging member 2, as shown in FIG. 5. Then, a new body 3 is clamped to the engaging recess 12 of the base 1 by the protruding ring 32, and the bump 35 of the body 3 is fitted into the groove 13. With the elastic element 2 returning to the original position, the protruding portion 23 of the engaging member 2 can be clamped to the concave portion 33, and the body 3 can be coupled to the base 1 to complete positioning and assembly.

In summary, the body of the quick release hotend of the present invention can be quickly coupled to or removed from the base by the positioning structures, such as the protruding ring clamping the body to the base and the engaging member elastically abutting the bottom of the body, which can be pressed and reset. During assembling, no additional alignment or calibration is required to ensure that the body can be aligned with and coupled to the predetermined position of the base, and the coupling is very stable and firm and is not prone to relative displacement. Even when the quick release hotend is subject to continuous high-frequency vibration or pulling force in the subsequent printing process, the body can be stably coupled to the base, and the coupling becomes even more stable after vibration. The problems of loosening or falling off of the body are solved, thereby achieving the effects of improved preciseness and quality of printed products. In addition, the operating temperature of the quick release hotend of the present invention can be quickly and effectively reduced through the heat dissipating portion of the body during the printing process, so that the quick release hotend can be more endurable to achieve a prolonged service life.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A quick release hotend, comprising:
   a base having an input portion and an engaging recess, wherein the base has a through-hole penetrating the input portion and communicating with the engaging recess, and the base has a chamber in which an elastic element is disposed;
   an engaging member having a first engaging portion and a second engaging portion provided at both ends of a rod, respectively, wherein the first engaging portion is separably coupled to the base and abut against the elastic element; and
   a body having a protruding ring and a feeding inlet; wherein the protruding ring is engaged with the engaging recess to communicate the feeding inlet with the through-hole; wherein a width of a top surface of the protruding ring is greater than a width of a bottom of the engaging recess, and a gap is formed between the top surface of the protruding ring and the bottom of the engaging recess after coupling; wherein the body has a concave portion, the second engaging portion has a protruding portion protruding from a surface of the second engaging portion toward the first engaging portion, and the protruding portion is tapered to have a width gradually decreasing from the surface of the second engaging portion to a top, wherein a surface of the protruding portion facing a surface of the rod forms a first inclined face, and the protruding portion is separably fastened to the concave portion;
   and wherein the body has a nozzle to which a raw material imported from the feeding inlet is guided.

2. The quick release hotend as claimed in claim 1, wherein the input portion is located on an upper surface of the base, and the base is extended to form a base wall defining an open space between the base and the base wall, and wherein the body has a seat, the protruding ring and the feeding inlet are located at a top of the seat, and the seat is disposed in the open space.

3. The quick release hotend as claimed in claim 2, wherein a lower surface of the base is concaved to form the engaging recess, and the engaging recess has a diameter which gradually increases from the bottom of the engaging recess toward the open space, providing the engaging recess with a substantially conical space, and wherein the protruding ring is matched with a shape of the engaging recess to closely fit with the engaging recess.

4. The quick release hotend as claimed in claim 2, wherein a bottom of the base wall is provided with a notch, and the second engaging portion is extended into the notch.

5. The quick release hotend as claimed in claim 2, wherein the base wall is provided with a groove which is communicated with the open space, the body has a bump which is located on one side of the seat, and the bump is fitted in the groove.

6. The quick release hotend as claimed in claim 5, wherein an engaging surface that the bump and the groove engage with each other is in a form of an inclined face.

7. The quick release hotend as claimed in claim 1, wherein an included angle between the first inclined face and the surface of the second engaging portion is 95 to 135 degrees.

8. The quick release hotend as claimed in claim 1, wherein the concave portion is in a conical shape and has a second inclined face, a slope of the second inclined face matches with a slope of the first inclined face, and the first inclined face abuts against and hooks with the second inclined face.

9. The quick release hotend as claimed in claim 8, wherein a gap is formed between a free end face of the protruding portion and a bottom of the concave portion.

10. The quick release hotend as claimed in claim 1, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

11. The quick release hotend as claimed in claim 2, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

12. The quick release hotend as claimed in claim 3, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

13. The quick release hotend as claimed in claim 4, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

14. The quick release hotend as claimed in claim 5, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

15. The quick release hotend as claimed in claim 6, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

16. The quick release hotend as claimed in claim 7, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

17. The quick release hotend as claimed in claim 8, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

18. The quick release hotend as claimed in claim 9, further comprising a displacement system provided with a fixing portion and a slide rail, with the fixing portion slidably disposed on the slide rail, wherein the fixing portion has at least one second coupling portion, the base has at least one first coupling portion, and the at least one first coupling portion is coupled to the at least one second coupling portion.

* * * * *